United States Patent
Brique et al.

(10) Patent No.: US 7,831,046 B2
(45) Date of Patent: Nov. 9, 2010

(54) METHOD OF MANAGING THE DISPLAY OF EVENT SPECIFICATIONS WITH CONDITIONAL ACCESS

(75) Inventors: Olivier Brique, Le Mont-sur-Lausanne (CH); Christophe Gogniat, Chavannes-près-Renens (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 185 days.

(21) Appl. No.: 10/537,306

(22) PCT Filed: Dec. 1, 2003

(86) PCT No.: PCT/IB03/05654

§ 371 (c)(1),
(2), (4) Date: Jun. 2, 2005

(87) PCT Pub. No.: WO2004/052005

PCT Pub. Date: Jun. 17, 2004

(65) Prior Publication Data

US 2006/0075423 A1    Apr. 6, 2006

(30) Foreign Application Priority Data

Dec. 3, 2002    (CH) ............................ 2044/02

(51) Int. Cl.
*H04N 7/167* (2006.01)
*G06F 11/30* (2006.01)
*G06F 12/14* (2006.01)

(52) U.S. Cl. .................. 380/239; 380/231; 713/193

(58) Field of Classification Search ............. 380/231, 380/239; 713/193
See application file for complete search history.

(56) References Cited

U.S. PATENT DOCUMENTS 5,223,924 A * 6/1993 Strubbe ...................... 725/46

(Continued)

FOREIGN PATENT DOCUMENTS

GB    2 349 290 A    10/2000

(Continued)

OTHER PUBLICATIONS

International Search Report and International Preliminary Examination Report.

*Primary Examiner*—Shin-Hon Chen
(74) *Attorney, Agent, or Firm*—Harness, Dickey & Pierce, P.L.C.

(57) ABSTRACT

The object of the invention is a method of managing the display of event specifications with conditional access, particularly to display an electronic program guide for Pay-TV.

This aim is reached by a method including the following steps:
  sending data forming an electronic program guide (EPG) to a decoder (STB), this electronic guide serving to display the events which will be broadcasted, these data including, for each event, at least one identifier, textual data and a condition block comprising the conditions required for the access to this event,
  sending at least one authorization message (EMM) to a security module (SC) associated with the decoder, this message defining access rights to an event;
  sending the condition block (PECM) to said security module (SC),
  processing, in the security module, the access condition contained in said condition block (PECM), and
  return by the security module of a message indicating, according to the access condition for each event and to the access rights contained in the security module, if the right exists or not for each event in the security module.

This method allows the management of requests in structured language and makes it possible to manage complex access conditions.

7 Claims, 2 Drawing Sheets

U.S. PATENT DOCUMENTS

| | | |
|---|---|---|
| 5,630,119 A | 5/1997 | Aristidis et al. |
| 6,694,482 B1* | 2/2004 | Arellano et al. ............. 715/251 |
| 7,185,355 B1* | 2/2007 | Ellis et al. ..................... 725/46 |
| 2001/0020297 A1* | 9/2001 | Inoue .......................... 725/39 |
| 2002/0059180 A1* | 5/2002 | Aoki et al. ..................... 707/1 |
| 2002/0066098 A1* | 5/2002 | Hamakawa ................... 725/39 |
| 2002/0087971 A1* | 7/2002 | Cochran et al. ............... 725/31 |
| 2002/0114465 A1* | 8/2002 | Shen-Orr et al. ............ 380/231 |
| 2002/0184652 A1* | 12/2002 | Cezeaux ..................... 725/132 |
| 2003/0063117 A1* | 4/2003 | Chang et al. ................. 345/721 |
| 2003/0088872 A1* | 5/2003 | Maissel et al. ................ 725/46 |
| 2003/0106057 A1* | 6/2003 | Perdon ........................ 725/45 |
| 2003/0196113 A1* | 10/2003 | Brown et al. ................ 713/201 |
| 2003/0200313 A1* | 10/2003 | Peterka et al. .............. 709/225 |

FOREIGN PATENT DOCUMENTS

| | | |
|---|---|---|
| WO | WO 97 42762 A | 11/1997 |
| WO | WO 02 15578 A | 2/2002 |

* cited by examiner

METHOD OF MANAGING THE DISPLAY OF EVENT SPECIFICATIONS WITH CONDITIONAL ACCESS

This invention concerns a method of managing the display of event specifications with conditional access, in particular in the Pay-TV domain.

In the conditional access systems, in particular in the digital Pay-TV domain, a digital data flow is transmitted towards the television set. This flow is encrypted in order to be able to control the use thereof and to define certain conditions for such use. This encryption is made thanks to certain control words, which are changed at regular intervals (typically between 5 and 30 seconds) in order to deter any attack aiming to find such a control word.

For the receiver to decipher the encrypted flow with these control words, these are sent to the receiver regardless of the flow in control messages (ECM) encrypted by an exclusive key of the transmission system between a management centre and a user unit security module. In fact, the security operations are carried out in a security module (SC), which is generally made as a smart card, intended to be tamper-proof. This module can be either of the removable type or directly integrated to the receiver.

At the time of the decryption of a control message (ECM), it is verified, in the security module (SC), that the right to access to the flow in question is present. This right can be managed by some authorization messages (EMM), which load such a right into the security module. Other solutions can also be considered, such as sending decryption keys.

In the following description, the term "event" will designate video, audio (for example MP3) or data content (game program for example), which are encrypted according to the known method of control words, each event being able to be ciphered by one or more control words, each of them having a given validity duration.

The accounting of the use of such events is today based on the principles of subscription, events purchase or payment by time unit.

The subscription allows the definition of a right associated with one or more broadcasting channels transmitting these events and allows the user to access to these channels in clear if the right exists in his/her security module.

At the same time, it is possible to define certain rights pertaining to a particular event, such as a film or a football match. The user can acquire this right (purchase for example) and this event will be specifically managed by this right. This method is known under the appellation "pay-per-view" (PPV).

A control message (ECM) not only contains the control word, but also the conditions for that word to be sent back to the receiver/decoder. At the time of the decryption of the control words, it will be verified if, in the security module, there is a right associated with access conditions stated in the message.

Whenever the comparison is positive the control word is returned to the user unit. This control word is contained in an ECM control message, which is encrypted by a transmission key.

For the right to be present in the security module, this is generally loaded in this module by an authorization message (EMM) which is, for security reasons, generally encrypted by a different key called right key (RK).

According to a known Pay-TV broadcasting form, the three following elements are necessary for deciphering an event at a given time:

the data related to the event encrypted by one or by a plurality of control words (CW), the ECM control message(s) containing the control words (CW) and the access conditions (AC)

the corresponding right stored in the security module allowing verification of said access conditions.

The principles described above are also used whenever one wishes to make the list of the channels, services or events visible to a user, channels services or events for which he/she has access as well as for those for which he/she can acquire the rights. For that purpose, an electronic program guide (EPG=Electronic Program Guide) is used and the events or channels for which the rights are already acquired are displayed for example in green, and in red those for which the rights have not been acquired.

When the rights' characterization is simple, for example when the user has subscribed to certain stated services for one determined validity duration, it is easy to generate an EPG that takes these rights into account. On the contrary, when one wishes to manage certain more complex rights, to offer promotions or to use conditions which have not been allowed in the subscription, the current systems do not allow the easy management of these elements.

The International patent application WO 97/42762 describes a data access system that can be particularly used in the Pay-TV domain. In this system, authorization messages are sent to the users' decoders. These messages contain, conventionally, the access rights to Pay-TV events. Furthermore, they contain some pointers, which indicate a location allowing the acquisition of additional data. This additional data can particularly consist in clear data relating to the events themselves or to certain software. This data is connected with the decoder and is generally accessible without any decryption. It is not contained in the authorization messages. This system does not allow the management of the security aspects related to complementary data and does not allow the management of variable access conditions according to the existing rights for each user, given that on principle these access conditions must be made secure.

This invention intends to compensate for the drawbacks of the prior art devices, by creating a device in which it is possible to manage complex rights thus offering great flexibility of use to a distributor.

This aim is reached by a method of managing the display of event specifications with conditional access, including the following steps:

sending data forming an electronic program guide (EPG) to a decoder (STB), this electronic guide serving to display the events which will be broadcasted, these data including, for each event, at least one identifier, textual data and a condition block comprising the conditions required for the access to this event, sending at least one authorization message (EMM) to a security module (SC) associated with the decoder, this message defining access rights to an event;

wherein the method furthermore comprises the following steps:

sending the condition block (PECM) to said security module (SC), processing, in the security module, the access condition contained in said condition block (PECM), and return by the security module of a message indicating, according to the access condition for each event and to the access rights contained in the security module, if the right exists or not for each event in the security module.

This invention and its advantages will be better understood with reference to the description of a particular embodiment and to the enclosed drawings, in which.

Figure 1:
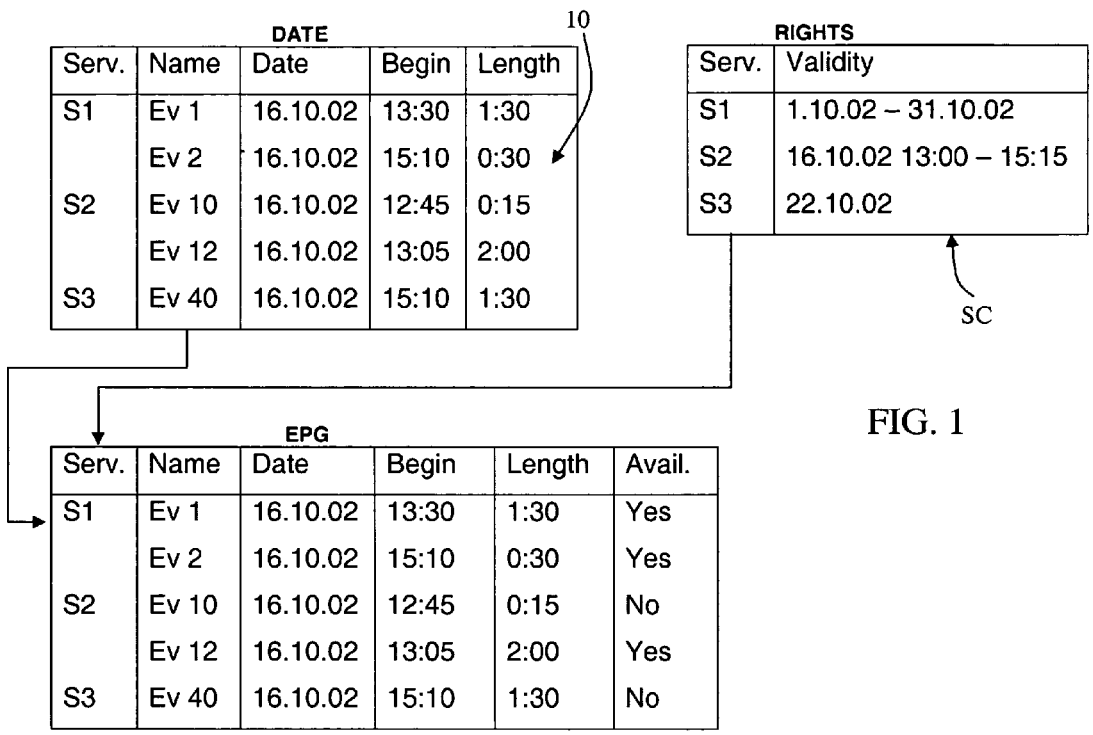
FIG. 1 shows schematically an embodiment of an electronic guide (EPG) according to the prior art.
Figure 2:
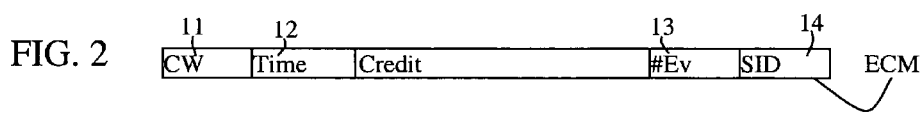
FIG. 2 shows schematically the contents of a control message (ECM) used in the embodiment of FIG. 1.

FIGS. 1 and 2 describe known systems of the prior art. In these systems, the data composing the electronic program guide EPG is transmitted by a service channel and is made up of timetable and textual data, such as, in particular, the event title, the description and may be some comments. The EPG data also contains the service to which this event is related to as far as access right is concerned, the services being referred to as for example S1 to S48.

At the same time, the broadcasted event is accompanied by the control messages ECM which contain a certain number of preset fields, having references 11 to 14 in FIG. 2, such as in particular the identifier event (field 13), the service to which it is related (field 14), the control word CW (field 11), the broadcasting time and date (field 12) and a possible credit associated to the event. Thanks to this structure preset by fields, the message structure is defined in such a way that for example on field 14, the number of a service SID will always be found.

This service is initialized by an authorization message EMM, which has the aim of defining a subscription block in the SC security module, this block containing among other things the validity duration of this service.

To display the electronic guide (EPG) on a user's television set, the decoder STB reads the rights contained in the SC security module, that is to say the aforementioned blocks. More precisely, it determines, according to these rights, the list of available services as well as the duration or validity date of each service. Thus, the decoder has on the one hand a database originating from the security module and containing the list of the available services with their validity duration and, on the other hand, a database intended for the EPG, which contains the list of events, the service to which it is related to and the diffusion date.

For each event, the decoder can thus verify if the security module has the right for the service in question and if this right will be valid at the moment of the event broadcasting. On the basis of the result of this comparison, the event will be displayed in the EPG, for example in red if the right is not acquired and in green if this right is acquired and thus present in the security module.

In FIG. 1, "Yes" is displayed in the last column of the EPG facing the event in question if the right for this event is acquired, and "No" if the right is not acquired.

At the moment of the broadcasting of an event, the ECM control messages, containing the control words CW and associated to this event, are processed in the security module in such a way that the existence of the rights associated to this event are verified. If the rights exist, each ECM control message is processed so that the control words CW that it contains are extracted therefrom. This control word is then sent to the decoder, which deciphers the data that has been encrypted with this specific control word.

This embodiment operates perfectly when the conditions are simple, for example when a user has subscribed to a services package. In this case, the decoder compares the contents of the preset fields in the data composing the EPG with the contents of the security module memory and obtains a reply which can be directly used.

In particular when one wishes to propose promotional offers, it can be necessary to define complex conditions, for which a preset fixed fields structure is not adapted. An example of such a promotional offer consists in allowing a free access to a range of channels, for the birthday of each subscriber. With a conventional system such an offer can be proposed, but at the expense of a large complication. In fact, to allow this, it is necessary to create additional rights, more precisely 365 subscription blocks, each one corresponding to one day of the year. These rights are managed like the other rights, which means that they are transmitted by certain EMM authorization messages. These messages must be sent again and again to all the beneficiaries, in order to be sure that everyone has received the rights.

On receipt of this message, a new subscription block will be created in the security module for this single use. It should be noted that these messages will absorb part of the bandwidth and part of the cryptographic means, particularly because of the high level encryption of these messages.

Another example of a promotional offer consists in invoicing a given event on the basis of several different amounts according to subscription types. The holder of a subscription for sport themed channels can for example pay a football match at a determined price, while people not having this kind of subscription must pay another amount for the same football match. In the present situation, it is not possible to manage this type of rules because the identification of the event is strictly identical for all the users, while the access conditions to this event depend on the event and on the parameters set for a user.

Today, according to the prior art, the solution would consist in sending an EMM authorization message pertaining to each user with the amount for the event having taken into account his/her specific conditions. We can easily imagine how many messages must be transmitted to satisfy all the users.

More generally, to be able to apply certain particular conditions for a particular event, it is necessary to have these conditions established in advance in the subscription of the users in question. If this is not the case, the management of the particular cases can prove to be difficult or even impossible. In all cases, to generate particular rights on the security module, it is necessary to dispatch certain EMM authorization messages, at such a sufficient frequency to be sure that the majority of the users have received the intended rights.

This embodiment is not very convenient because of the fact that it takes up a large amount of memory and the traffic of the authorization messages EMM does not take full advantage of the available bandwidth.

Figure 3:
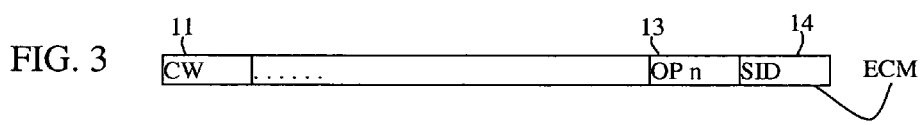
FIG. 3 shows the content of a control message (ECM) according to this invention.

In FIG. 3, which describes an embodiment of the invention, the control message ECM does not contain any more a data to a preset location, but an operation Op. This is written under a request form, using for example a syntactic language such as the one known under the acronym SQL (Structured Query Language).

The present invention is particularly advantageous in comparison with the prior art known systems because of the fact that the conditions defined by requests of the SQL type can be imagined, modified or used in a very flexible way, at any time. Being free of preset data fields in the control messages ECM opens the way to combinations not anticipated at the starting point of the system and therefore not set in the users' subscription.

Consequently, with this simplified management, it is possible to propose very diversified offers, even for very small groups. It is thus possible to generate well target offers that are close to the company's marketing views.

At the time of the processing of such an ECM control message, the operation Op is treated by the SQL motor of the security module SC and the return or no-return of the control word CW contained in this same message will depend on the result.

As for ECM control messages, it is also considered, within the context of the invention, to replace the fields of an EMM authorization message by a request of type SQL.

The data memorized in the security module, defining the subscription blocks, remains unchanged, only the operations on these data change.

As example, a request of this type could be:
Service S22 valid or birthday date=10 October.
Another example of complex request for an impulsive purchase could be:
If the security module contains the rights for S1, S8 and S12 services, then deduce an amount of 4 USD for the Ev 1 event, if not, then deduce an amount of 5 USD for this event.

In this embodiment, the decoder STB is not authorized to process a complex request in SQL language, mainly for security reasons.

In the context of this invention, the solution consists in modifying the data transmitted to the EPG, this modification consisting in including in these data a new block, which is a partial copy of the control message ECM that will be transmitted with the event in question.

This block called condition block (PECM) comprises at least the same SQL request as the control message from which it is derived. According to the chosen implementation, the other fields such as the control word can be removed. Obviously, the control messages ECM are transmitted when the event is visualized by the user, since they contain the control words CW. On the contrary, the conditional blocks must be sent in advance since they are used to form the EPG which allows the user to visualize in advance the rights he/she has already acquired and those he/she can acquire.

On the receipt of these data by the EPG, this PECM block will be transmitted to the security module, which is able to process complex requests, especially in SQL language.

Figure 4:
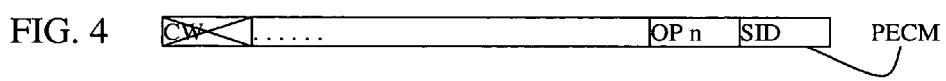
FIG. 4 shows the contents of a condition block used in the system according to the invention.

This PECM block is illustrated in FIG. 4. The security module will process this condition block in a conventional way and will be able to extract the SQL request therefrom. The conditions defined in this request are analyzed in the security module and the request result is retransmitted to the STB decoder. Thanks to this result, the EPG can be displayed in the way previously explained, with reference to the description of the prior art.

Figure 5:
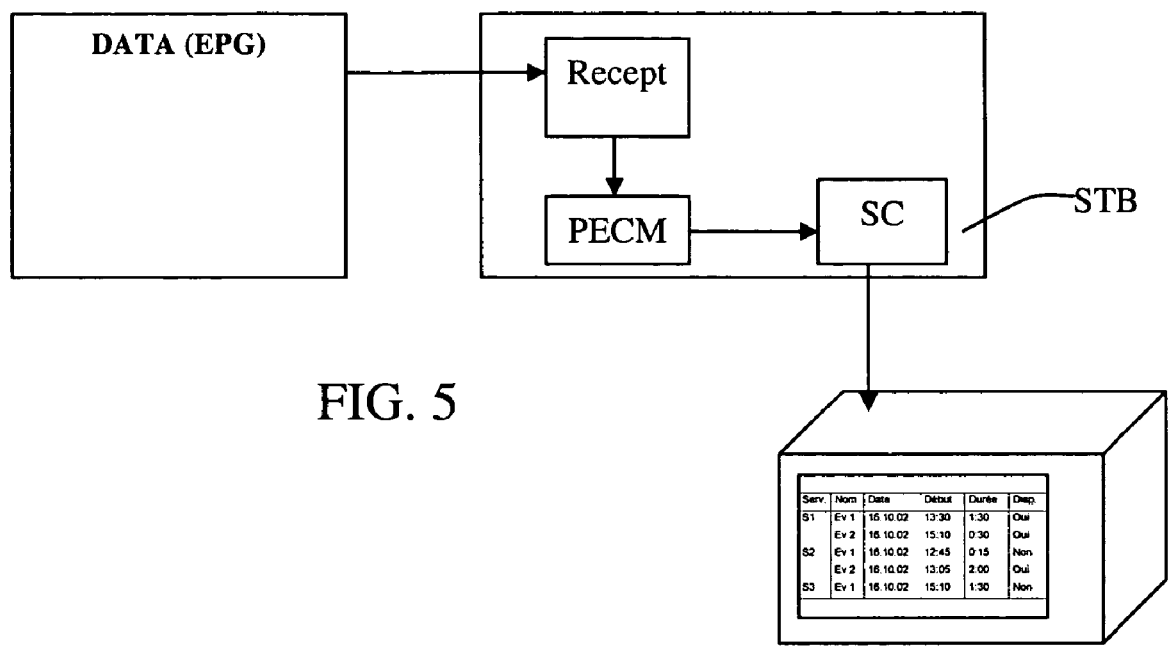
FIG. 5 represents an embodiment of an electronic guide EPG according to the invention.

This process is schematically represented by FIG. 5. More particularly, the data permitting to form the EPG are transmitted to the decoder STB. A condition block PECM, containing, under the form of SQL request, the operation that permits the definition of the access conditions, is formed and then transmitted to the security module SC. This module processes the SQL request. The conditions of the SQL request are compared with the rights inscribed in the security module so that the events for which the rights are acquired or can be acquired can be determined. These available rights are associated with the EPG data. The list of the events is then displayed on the user's television set, distinguishing for each event, whether the security module has the rights or not.

The invention claimed is:

1. A method of managing a display of events with conditional access, the method comprising:
   sending data forming an electronic program guide (EPG) to a decoder, the EPG displaying a list of events being broadcast, the data for the list of events including, for each event of the list of events, at least one identifier, textual data and a condition block, the condition block including conditions required for accessing the event,
   sending at least one authorization message to a security module associated with the decoder, the at least one authorization message defining access rights to the event, wherein
   the access conditions contained in the condition block are expressed in a form of an operation described by a request in a structured language, the operation based on at least two parameters, a first parameter of the at least two parameters being directly linked to the event or to a channel on which the event is broadcast and a second parameter of the at least two parameters being independent of the event or of a channel on which the event is broadcast; and
   a structured language motor seeks, in the security module, the operation contained in the condition block, and the structured language motor executes the operation, wherein said execution uses at least said first parameter that is directly linked to the event or to the channel on which the event is broadcast and said second parameter independent of the event of the event or of the channel on which the event is broadcast, the execution of said operation resulting in a grant or a denial of an access right, depending on both first and second parameters;
   returning to the decoder a result of the execution; and
   displaying the list of events in the EPG based on the execution result of the operation and identifying a displayed event from another displayed event in the list of events based on the access rights.

2. The management method according to claim 1, wherein the request is written in SQL language (Structured Query Language).

3. The management method according to claim 1, wherein the one event to be broadcast is encrypted by at least one control word, the at least one control word is transmitted to the decoder in the form of an encrypted control message and the encrypted control message including the access conditions, wherein at least a portion of the encrypted control message is transmitted in the conditional block.

4. The management method according to claim 3, wherein the condition block only includes the data relating to the access conditions contained in the control message.

5. The management method according to claim 4, wherein the data related to the access conditions is sent in an encrypted form in the condition block.

6. The management method according to claim 4, wherein the data related to the access conditions is sent in an unencrypted form in the condition block.

7. The management method according to claim 1, wherein the second parameter of the at least two parameters includes at least one of a viewing history of the subscriber, at least one occasion specific to the subscriber and a subscription of at least one channel not directly linked to the event being broadcast.

* * * * *